United States Patent [19]

Ishida et al.

[11] Patent Number: 5,886,890
[45] Date of Patent: Mar. 23, 1999

[54] POWER-SUPPLY SYSTEM INVOLVING SYSTEM INTERCONNECTION

[75] Inventors: Takeo Ishida; Ryuzo Hagiwara; Shinichi Kozuma; Hitoshi Kishi, all of Osaka, Japan

[73] Assignee: Sanyo Electric Co., Ltd., Osaka, Japan

[21] Appl. No.: 881,205

[22] Filed: Jun. 24, 1997

[30] Foreign Application Priority Data

Jun. 24, 1996 [JP] Japan ..................................... 8-162808
Jun. 24, 1996 [JP] Japan ..................................... 8-162809

[51] Int. Cl.$^6$ ..................................................... H02M 7/23
[52] U.S. Cl. ................................................................ 363/71
[58] Field of Search ........................ 363/65, 71; 323/906; 307/16, 24, 31, 33

[56] References Cited

U.S. PATENT DOCUMENTS 3,696,291  10/1972  Horne ......................................... 324/51
5,548,504   8/1996  Takehara ................................... 363/71
5,654,627   8/1997  Shimazu et al. ......................... 323/258

FOREIGN PATENT DOCUMENTS

A-5308780  11/1993  Japan .

Primary Examiner—Matthew Nguyen

[57] ABSTRACT

A power-supply system involving system interconnection includes a plurality of AC modules, each of which includes a solar cell module and an inverter unit which outputs a single-phase alternating current. The AC modules are connected to the single-phase three-wire distribution line such that the number of AC modules connected to the outer conductor R is the same as the number of AC modules connected to the outer conductor T. Each AC module has three junction pole pieces. Adjacent AC modules are connected to each other via a connecting cable connected to the junction pole pieces. Each AC module has a change-over circuit so as to be selectively connected to one of the outer conductors R or T. The power-supply system further includes an independent operation control device for independently operating the AC modules when the connection between the AC modules and the commercial electric power system is cut.

24 Claims, 9 Drawing Sheets

5,886,890

POWER-SUPPLY SYSTEM INVOLVING SYSTEM INTERCONNECTION

BACKGROUND OF THE INVENTION

1. Field of the Invention

This invention relates to a power-supply system involving system interconnection effected by a plurality of AC modules connected to a single-phase three-wire distribution line. The invention also relates to an AC module used therein.

2. Description of the Prior Art

At the present time, a power-supply system involving system interconnection is being put to practical use. As disclosed in Japanese Laid Open Patent Application No. 5-308780, this power-supply system comprises a solar battery connected to a single-phase three-wire commercial electric power system through an inverter so that electric power generated by the solar battery may be supplied to a load such as a household electric appliance.

For example, a solar battery delivers a terminal voltage of 180 V when six solar cell modules, each of which is capable of delivering a DC voltage of about 30 V, are electrically interconnected in series to form the solar battery. A DC voltage of 180 V obtained therefrom is converted by an inverter into a single-phase AC voltage of 100 V. The output terminals of the inverter are connected to two outer conductors R and T of a single-phase three-wire distribution line.

Thus, in order to apply a DC voltage of about 180 or 360 V to the inverter, the prior art power-supply system of the kind indicated above employs about six or twelve solar cell modules electrically interconnected in series, which have a disadvantage that, when a single solar cell module develops trouble, all the solar cell modules become incapable of being used.

The prior art power-supply system of the kind indicated above has another disadvantage that, in some places where the solar cell modules are installed, there is a period of time when a building or the like shades some of the solar cell modules. A decline in the output from the shaded solar cell modules results in generated energy varying with solar cell modules to such an extent that maximum output cannot be taken from the solar battery even under the control of a maximum power point tracker (MPPT).

The prior art power-supply system of the kind indicated above is provided with a protective device for cutting the connection between the inverter and the commercial electric power system when an abnormal condition occurs or an accidental power failure happens in the commercial electric power system. The protective device detects the abnormal condition or the accidental power failure, opens a switch so as to cut the connection between the inverter and the commercial electric power system within the prescribed length of time, and suspends the operation of the inverter.

In that event, therefore, electrical energy generated by the solar battery is not utilized. Such a failure to make good use of the sunlight has presented a serious problem.

SUMMARY OF THE INVENTION

The primary object of the invention is to provide a power-supply system of the kind indicated above, which can be kept working even when one of the solar cell modules develops trouble, which allows maximum output to be taken from the solar battery even when generated energy varies with solar cell modules, and which features high conversion efficiency.

Another object of the invention is to provide a power-supply system of the kind indicated above, in which an inverter can be kept working even when the connection between the inverter and the commercial electric power system is cut. This arrangement allows electrical energy generated by the solar battery to be effectively used.

The power-supply system in accordance with the invention includes at least one AC module comprising a solar cell module and an inverter unit which outputs a single-phase alternating current. The AC module is connected to a single-phase three-wire distribution line comprising a neutral conductor and two outer conductors R and T. The power-supply system in accordance with the invention further includes an independent operation control device for independently operating the AC module when the connection between the AC module and the commercial electric power system is cut.

A solar cell module is capable of delivering a DC voltage of about 30 V. The inverter unit comprises a DC to DC converter which converts the output from the solar cell module into a DC voltage of about 180 V and a voltage type inverter which converts the output from the DC to DC converter into an AC voltage of 100 V having a frequency of 50 or 60 Hz.

In one described embodiment, a plurality of AC modules are connected to the single-phase three-wire distribution line such that the number of AC modules connected to the outer conductor R is the same as the number of AC modules connected to the outer conductor T. A connecting branch has one end connected with one of three terminals provided on each AC module and the other end thereof connected with a cable. If each AC module is provided with a switchover device capable of making a switchover from connection with the outer conductor R to connection with the outer conductor T and vice versa, hitherto necessary interruptions for making such a switchover will be eliminated. Furthermore, this switchover device facilitates the apportionment of AC modules to the outer conductors R and T. A jumper circuit or a change-over switch may be used as the switchover device.

In another described embodiment, the independent operation control device comprises a reference signal generator, secondary battery, battery charger, second inverter and general control unit.

When the connection between the first mentioned inverter and the commercial electric power system is cut, the reference signal generator transmits a signal to the AC modules through the distribution line. The voltage and frequency of the signal are the same as those of the current which has flowed through the commercial electric power system, e.g., 100 V and 50 or 60 Hz. At the time of independent operation, the AC modules detect the reference signal transmitted by the reference signal generator and output a current having the same frequency as the reference signal.

The general control unit controls the output current or output voltage furnished by the first mentioned inverter so that the secondary battery may not be overcharged by the battery charger. For example, when the terminal voltage of the secondary battery is built up as the charge progresses, the general control unit transmits a command signal so that a substantial decrease in the charging current may be obtained. The general control unit transmiits another command signal for controlling the output current of the AC modules so as to make the input voltage applied to the battery charger well within a specified tolerance.

The secondary battery serves as a power source for the second inverter which outputs, e.g., a commercial alternating current to be utilized in case of emergency. A fuel cell or a storage cell may be used as the secondary battery.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DESCRIPTION OF THE PREFERRED EMBODIMENTS

Figure 1:
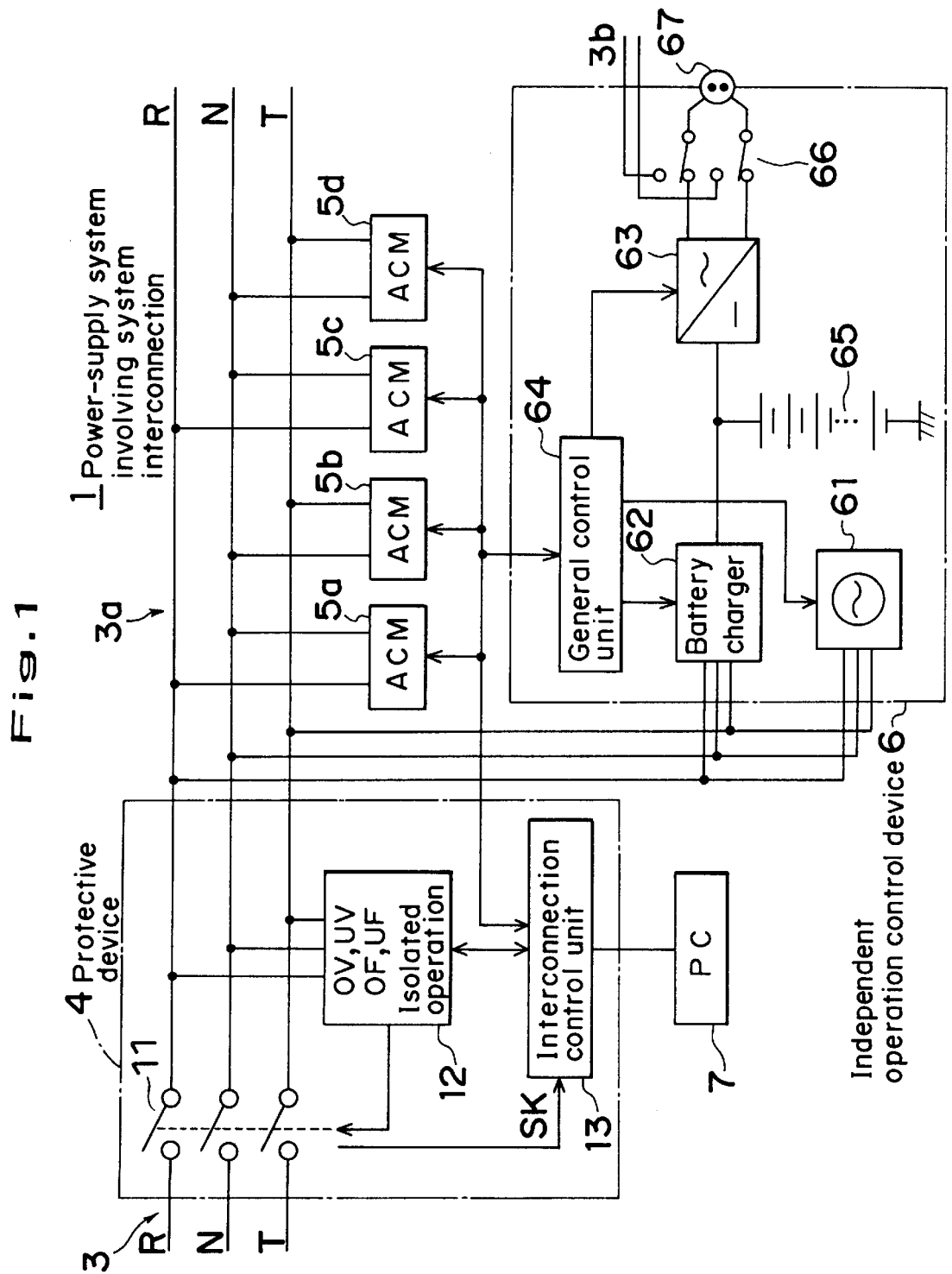
FIG. 1 is a diagrammatic view of the electrical circuit used in a power-supply system in accordance with the invention.

Referring now to FIG. 1, a power-supply system 1 in accordance with the invention comprises a single-phase three-wire distribution line 3 which is a type of the commercial electric power system, a protective device 4, AC modules 5a, 5b, 5c, etc., an independent operation control device 6 and a personal computer 7. All or some of the AC modules 5a, 5b, 5c, etc. may be hereinafter referred to as the AC module 5 or the AC modules 5.

A single-phase alternating current is allowed to flow through the distribution line 3, which comprises a neutral conductor N and two outer conductors R and T. The neutral conductor N is maintained at a difference of potential of 100 V from each of the two outer conductors R and T. These two outer conductors per se have 200 V maintained between them.

The protective device 4 comprises switches 11, a malfunction detector circuit 12 and an interconnection control circuit 13.

The connection between the AC modules 5 and the distribution line 3 is cut when the switches 11 are opened in response to a signal received from the malfunction detector circuit 12.

The malfunction detector circuit 12 includes an overvoltage relay, undervoltage relay, overfrequency relay and underfrequency relay, and examines the commercial electric power system for evidence of abnormal voltage and/or frequency. When abnormal voltage and/or frequency is detected, the malfunction detector circuit 12 outputs a signal for opening the switches 11. The malfunction detector circuit 12 further fulfills active and passive functions of coping with the isolated operation of an AC module or modules 5. When an AC module or modules 5 are put in an isolated mode of operation because of an accidental power failure or the like which happens in the commercial electric power system, the malfunction detector circuit 12 detects such a mode of operation and outputs a signal for opening the switches 11.

The interconnection control circuit 13 has communications terminals specified as the interface RS485, and effects control over the whole of the protective device 4. When the switches 11 are opened by the malfunction detector circuit 12 detecting abnormal voltage and/or frequency, the interconnection control circuit 13 transmits a command to all the AC modules 5 so as to block the flow of current therethrough. The interconnection control circuit 13 receives a signal SK which indicates that the switches 11 are open or closed, forwards the signal SK to the independent operation control device 6, and collects information from the AC modules 5 on the states of operation and power generation.

The interconnection control circuit 13 communicates with the personal computer 7, which receives information from the protective device 4 and monitors whether or not electric power is being produced properly and whether or not some trouble is being developed in the AC modules 5.

Figure 2:
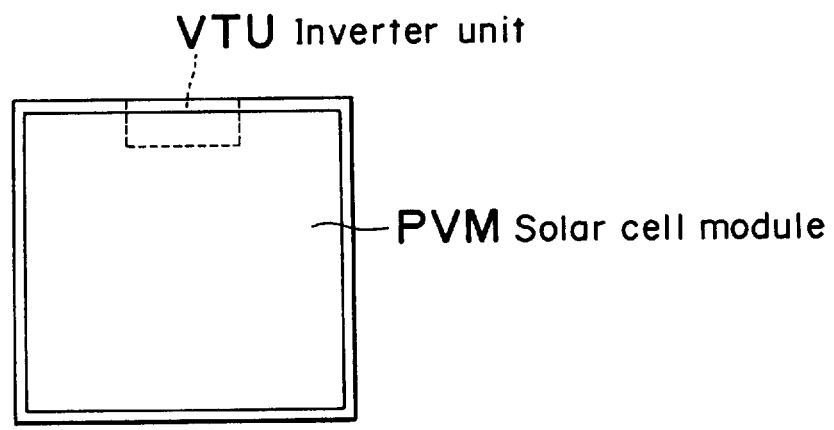
FIG. 2 is a general view of the AC module used therein.

As shown in FIG. 2, the AC module 5 comprises a solar cell module PVM and an inverter unit VTU. The solar cell module PVM is capable of delivering a DC voltage of about 30 V. The inverter unit VTU comprises a DC to DC converter (i.e. a converter circuit 21 shown in FIG. 3) which converts the output from the solar cell module PVM into a DC voltage of about 180 V and a voltage type inverter (i.e. an inverter circuit 23 shown in FIG. 3) which converts the output from the DC to DC converter into an AC voltage having a frequency of 50 or 60 Hz.

In order to effect interconnection with a commercial electric power system, a plurality of AC modules 5 are connected to the distribution line 3a such that the number of AC modules connected to the outer conductor R is the same as the number of AC modules connected to the outer conductor T. In referring to FIGS. 6(A) and 6(B), it will be noted that only two examples of the relative positions to be occupied by the AC modules 5 at the time of outdoor installation are illustrated. These arrangements have the following advantages:

(1) Although each of the solar cell modules PVM is at the mercy of different environmental conditions such as a compass direction, shade and temperature, the adverse influence which may be exerted by a difference in these environmental conditions can be minimized by the aforesaid arrangements. Each of the solar cell modules PVM can be controlled by an MPPT to the end that the power generation is rendered efficient.

(2) Some of the solar cell modules PVM are connected in parallel to the neutral conductor and the outer conductor R, while others are connected in parallel to the neutral conductor and the outer conductor T. Thus the aforesaid arrangements make good use of the space and facilitate the design and execution of the work of installation.

(3) The output from an AC module 5 is as low as about 100 watts. This means that the power-supply system in accordance with the invention can be run on various scales ranging from about 100 watts to several kilowatts according to how many AC modules 5 are installed and that, although an even number of AC modules 5 are required for obtaining phase balance between the outer conductors R and T of the distribution line 3, unbalance caused by an odd number of AC modules 5 amounts merely to 100 watts at most.

(4) The power-supply system in accordance with the invention does not include a DC circuit and obviates the necessity for a reverse blocking diode which would incur energy loss. Wiring, which is required only for the AC circuit, can be executed in the same manner as the ordinary house wiring.

(5) The number of inverter units VTU used in the power-supply system in accordance with the invention, which is more than ten times as large as the number of those used in a 3-kilowatt inverter module, is large enough to produce the effect of reducing the cost when the inverter units VTU are mass-produced.

(6) Each of the AC modules 5 does not have a complicated and cumbersome function of protecting the system interconnection and controlling the independent operation, but has only a function of self-protection. Consequently, the electrical circuit of each AC module 5 is of simple design, which serves to greatly reduce the number of circuit elements. This means a further saving in cost and a highly reliable electrical circuit.

(7) A compact arrangement is attained when a thick film integrated circuit or the like is used in the main circuit of each AC module 5.

(8) The output voltage developed across each inverter unit VTU is 100 V, which is half of 200 V maintained between the two outer conductors R and T of the distribution line 3. This means that the inverter units VTU feature high overall conversion efficiency.

(9) When the loads are so disposed that they are unbalanced, for example, voltage of AC modules 5 connected to the outer conductor R is 102 V and voltage of AC modules 5 connected to the outer conductor T is 98 V, the unbalance can be obviated or reduced by increasing the number of AC modules 5 connected to the outer conductor T (the more loaded ones) so that there are more AC modules connected to the outer conductor T than AC modules 5 connected to the outer conductor R.

Figure 3:
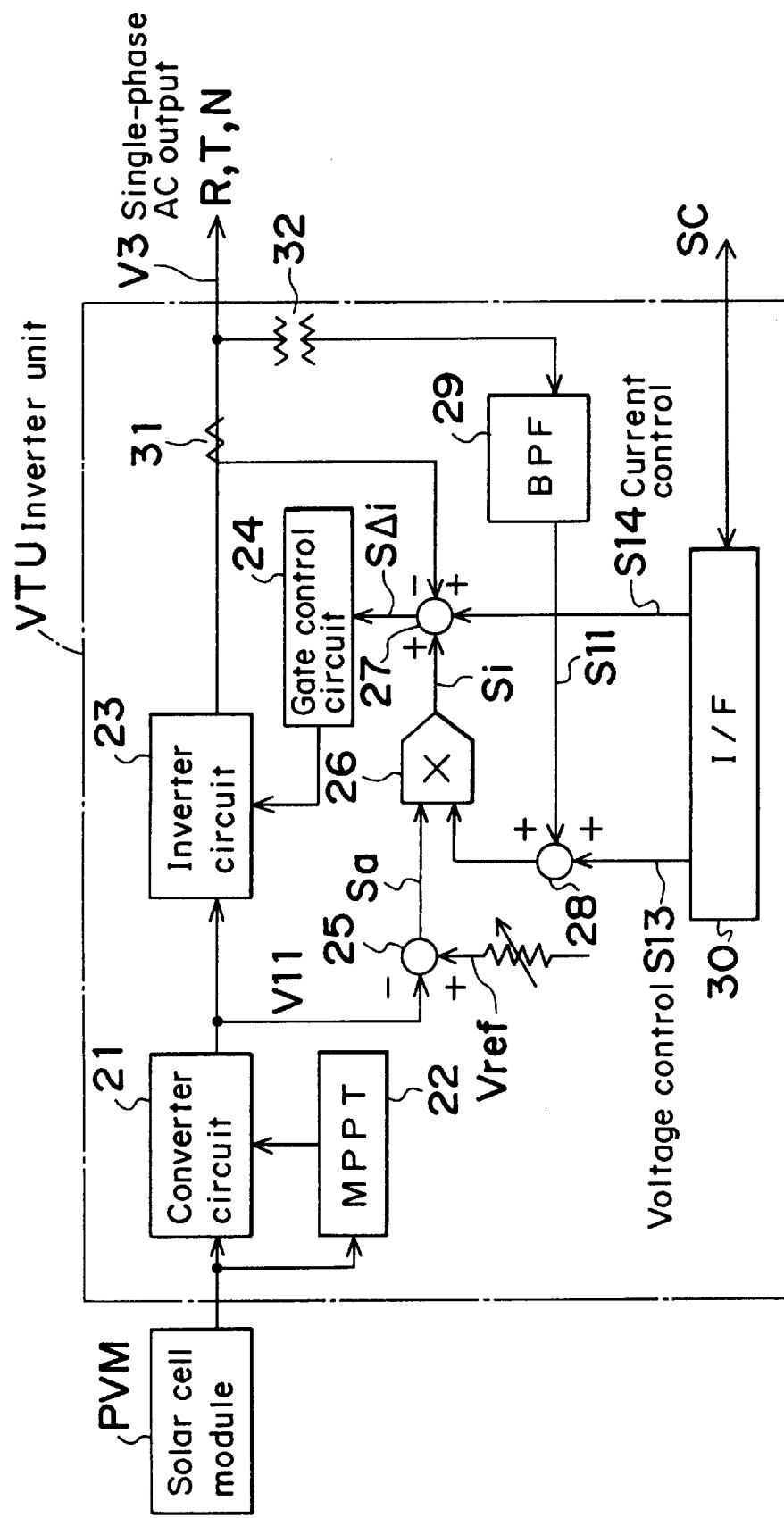
FIG. 3 is a diagrammatic view of the electrical circuit used in the AC module.

Referring now to FIG. 3, the inverter unit VTU comprises a converter circuit 21, MPPT circuit 22, inverter circuit 23, gate control circuit 24, operational amplifier 25, multiplier 26, operational amplifiers 27 and 28, band-pass filter 29, interface 30, current transformer 31 and transformer 32.

The converter circuit 21 effects radio-frequency switching action in converting a DC voltage of about 30 V outputted from the solar cell module PVM into a DC voltage of about 180 V. In order to take maximum output from the solar cell module PVM, the MPPT circuit 22 tracks an optimum operating point in a manner well known in the art.

The inverter circuit 23 consists of a plurality of switching elements connected to form a bridge. The gate control circuit 24 has a microprocessor and transmits a switching control signal to the inverter circuit 23 after subjecting the signal to pulse width modulation.

Voltage V11 fed to the inverter circuit 23 is also fed to the operational amplifier 25, which develops an input error signal Sa in the form of a difference between the voltage V11 and the voltage command signal Vref. The input error signal Sa is received on one input line of the multiplier 26, while a signal S12 is received on the other input line thereof. The signal S12 originates from the operational amplifier 28, in which a voltage control signal S13 originating from a signal SC is added to the fundamental frequency component S11 of voltage V3 at the junction point between the inverter unit VTU and the commercial electric power system, the voltage V3 being fed to the operational amplifier 28 through the band-pass filter 29. The signal S12 multiplied by the input error signal Sa makes a current command signal Si indicating the required control level. The current command signal Si, an actual output current detected by the current transformer 31, and a current control signal S14 originating from the signal SC are fed to the operational amplifier 27, which develops a current error signal S$\Delta$i to be fed to the gate control circuit 24.

The gate control circuit 24 develops a switching signal to be fed to the inverter circuit 23. The pulse width of the switching signal has been adjusted as a result of a comparison of the current error signal S$\Delta$i with a reference signal which takes the form of triangular pulses having a frequency of about 20 kHz.

The interface 30 carries out digital and serial communication with external devices through an interface RS485, receives the voltage control signal S13 and the current control signal S14 from the external devices, and transmits information to the external devices on the working condition of the inverter unit VTU.

The aforesaid feedback control allows AC power having a power factor of 1 to be outputted from the inverter circuit 23 to the loads connected to the outer conductors R and T respectively of the distribution line 3, wherein the value of the current is properly set and the current is in phase with the voltage of the commercial electric power system.

When the inverter unit VTU is in connection with the commercial electric power system, voltage V3 at the junction point between the inverter unit VTU and the commercial electric power system is equal to the voltage of the commercial electric power system.

However, voltage V3 is reduced to zero when the connection between the inverter unit VTU and the commercial electric power system is cut. In this case, AC voltage, which is the same as that supplied by the commercial electric power system, is supplied by a reference signal generator 61 (FIG. 1) in place of the commercial electric power system so that the inverter unit VTU may be kept working. Furthermore in this case, e.g., where the switches 11 provided in the protective device 4 are open, control can be effected by means of the voltage control signal S13 which takes the place of voltage V3. The voltage control signal S13 must be controlled at high speed, because it must have a prescribed waveform with a suitable frequency. In order to meet this requirement, the inverter unit VTU may include an oscillator from which a favorable waveform is obtainable in a suitable frequency range. The amplitude of the output from the oscillator may be controlled by means of the signal SC. The intensity of the output current can be controlled by means of the current control signal S14.

The following is a resume of a typical method of connecting the AC modules 5 to the distribution line 3a (or 3).

Figure 4:
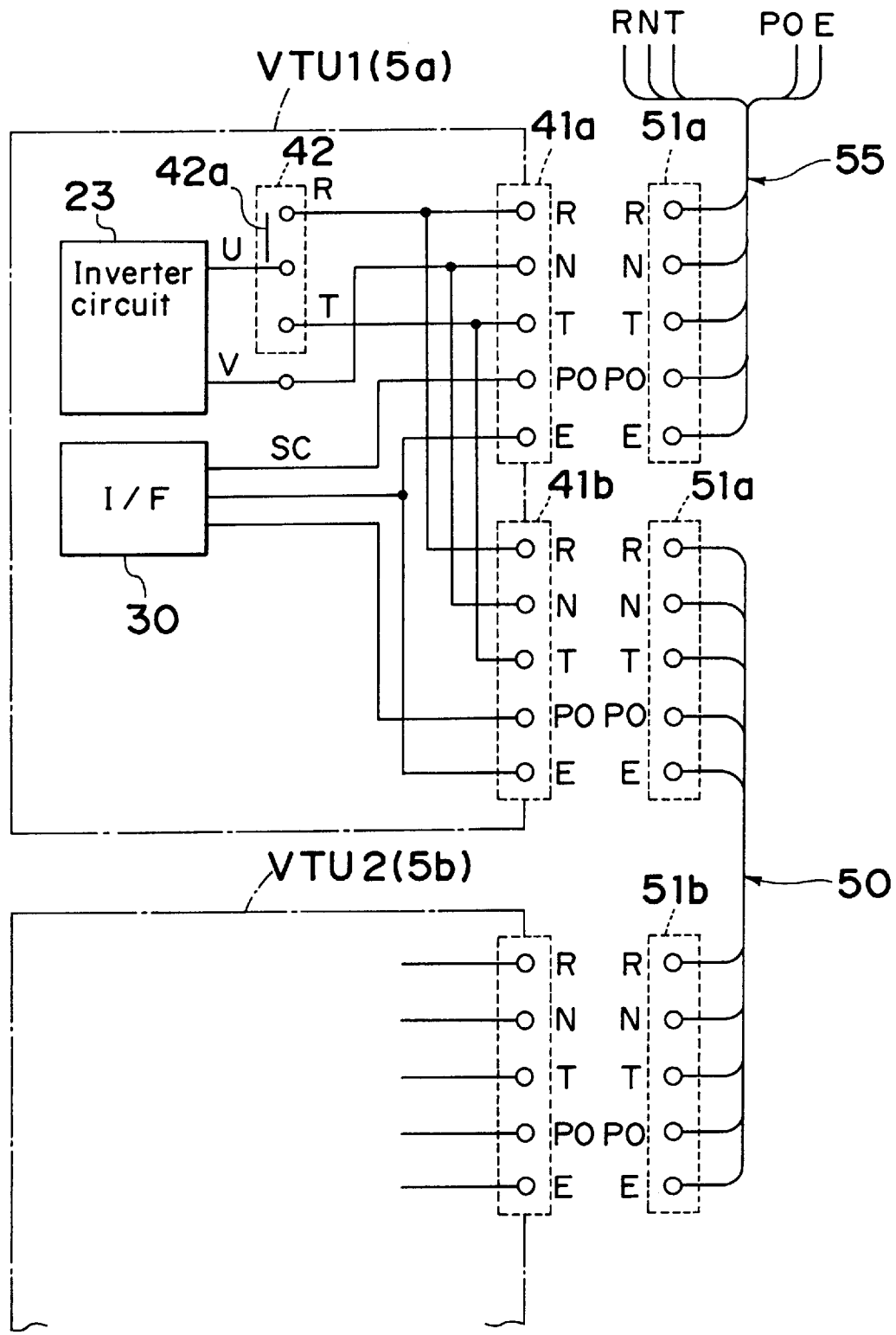
FIG. 4 is a diagrammatic view showing the AC modules being connected to a distribution line.

Referring now to FIG. 4, two stationary connectors 41a and 41b are mounted on the inverter unit VTU. Each of the stationary connectors 41a and 41b is provided with five junction pole pieces R, N, T, PO and E for connecting an output terminal of the inverter circuit 23 to the outer conductor R or T. The junction pole pieces provided on the stationary connector 41a are connected in parallel to the corresponding junction pole pieces provided on the stationary connector 41b.

Alternatively, each of the stationary connectors 41a and 41b may be provided only with three junction pole pieces R, N and T, and the remaining two junction pole pieces PO and E may be connected by means of connecting lines falling under a separate system, which may include further junction pole pieces in addition to PO and E.

A jumper circuit 42 is interposed between the junction pole pieces R, T and an output terminal of the inverter circuit 23. By flipping a jumper wire 42a to one side or the other, the output terminal of the inverter circuit 23 will be selectively connected to the outer conductor R or T.

Figure 5:
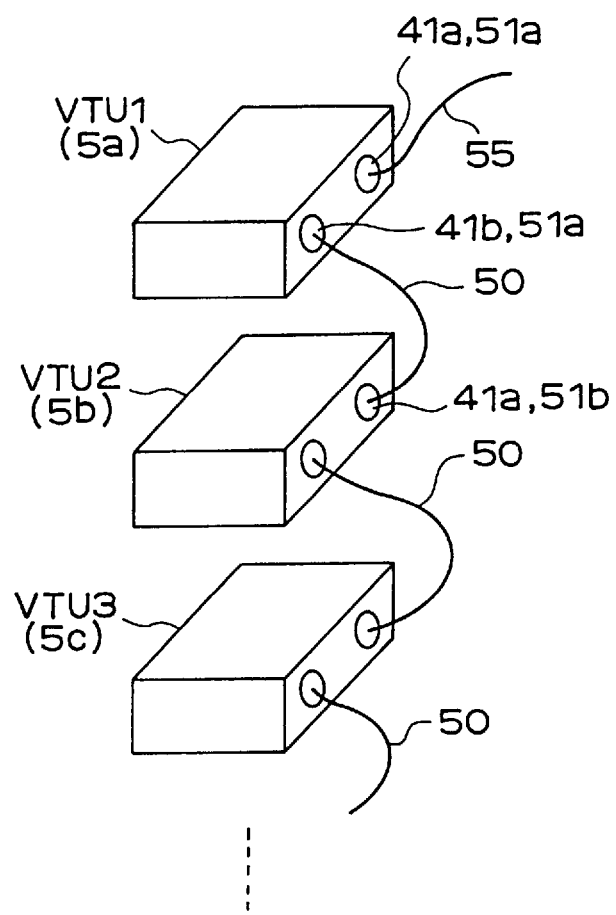
FIG. 5 is a view to help explain a connection of the AC modules.

Referring now to FIGS. 4 and 5, adjacent inverter units VTU are connected to each other by means of a connecting cable 50. Connectors 51a and 51b are provided one at each end of the connecting cable 50. Each of the connectors 51a and 51b is provided with five junction pole pieces R, N, T, PO and E to be connected to the corresponding junction pole pieces provided on the stationary connector 41a or 41b. The connectors 51a and 51b are inserted into the stationary connectors 41b and 41a mounted respectively on the adjacent inverter units VTU. In this manner, a plurality of inverter units VTU, hence a plurality of AC modules 5, are connected one after another.

The numeral VTU1 refers to an inverter unit which stands first in the row of the aforesaid plurality of inverter units VTU. A connector 51a provided at one end of a connecting cable 55 is inserted into the stationary connector 41a of the inverter unit VTU1. The connecting cable 55 contains five wires, of which three, i.e. R, N and T, are connected to the distribution line 3a and two, i.e. PO and E, are connected respectively to the protective device 4 and an interface circuit incorporated in the independent operation control device 6.

Thus, an output terminal of each of the AC modules 5 is connected to the outer conductor R or T of the distribution line 3. The interface 30 incorporated in each of the AC modules 5 transmits a signal SC to the protective device 4 and the independent operation control device 6 through the junction pole pieces PO and E.

Figure 6:
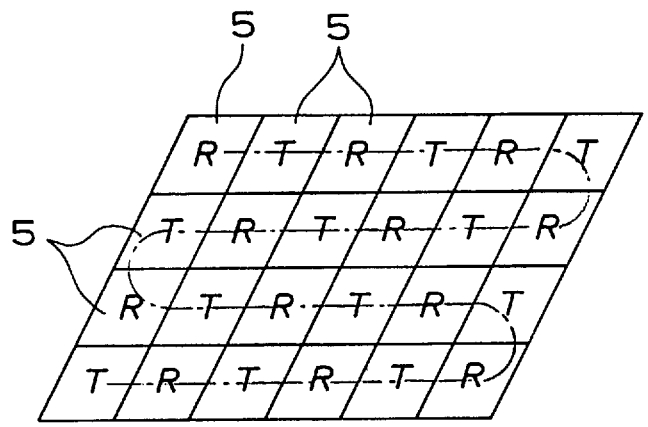
FIGS. 6(A) and 6(B) show diagrammatically the relative positions of the AC modules.
Figure 6:
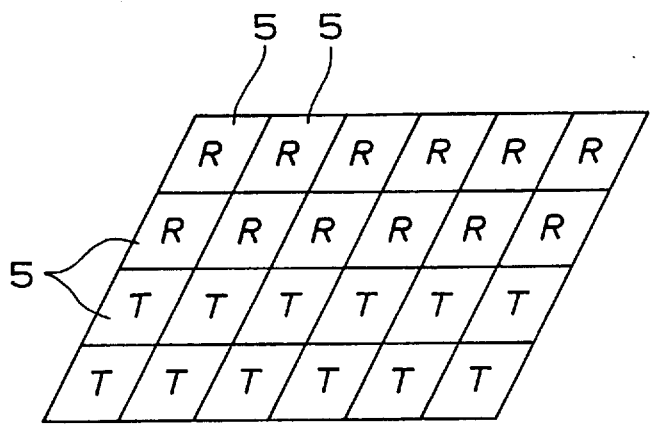

Referring now to FIG. 6(A), a plurality of AC modules 5 (or 24 AC modules in this embodiment) are arranged checkerwise. As indicated by a dot-dash line, adjacent AC modules 5 are connected to each other by means of connecting cables 50. In rows as well as in columns, the AC modules 5 connected to the outer conductor R alternate with those connected to the outer conductor T. Such staggered arrangement is facilitated by the provision of the jumper wires 42a.

The staggered arrangement shown in FIG. 6(A) has the advantage that, when a building or the like shades some of the AC modules 5, nearly half of the shaded AC modules 5 always turn out to be connected to the outer conductor R and the other half turn out to be connected to the outer conductor T. Thus, drastic imbalance can be avoided.

Wiring for connecting the AC modules 5 to the distribution line 3a is facilitated by the use of the connecting cables 50 provided with standardized connectors, by means of which adjacent AC modules 5 are connected to each other irrespective as to whether they are to be connected to the outer conductor R or T. With such an arrangement, it is impossible to commit an error in wiring. Time required for the wiring can be greatly lessened. By flipping the jumper wire 42a to one side or the other, a switchover from the connection to the outer conductor R to the connection to the outer conductor T and vice versa can be easily made without moving the AC module 5 to a new position.

Referring now to FIG. 6(B), the AC modules 5 connected to the outer conductor R form an upper double line, while the AC modules 5 connected to the outer conductor T form a lower double line. Thus the AC modules 5 gather together in two groups, with the result that they can be easily supervised. However, when they are partially shaded, there is every probability that the balance between the two groups is lost.

When one of the AC modules 5 develops trouble, when the loads are so disposed that they are unbalanced, or when the number of AC modules 5 is increased or decreased, the working AC modules 5 are balanced as a whole by flipping the jumper wire 42a in one of the working AC modules 5.

From FIGS. 6(A) and 6(B), it will be apparent that the overall length of a wire required for being contained in the connecting cables 50 can be greatly lessened, because each connecting cable has only to contain three pieces of wire for connecting the AC modules 5 to the distribution line. This means a further saving in cost, higher reliability and easier maintenance.

In order to effect staggered arrangement as shown in FIG. 6(A), the AC modules 5 to be connected to the outer conductor R may of course be connected separately from the AC modules 5 to be connected to the outer conductor T. In this case, however, the overall length of a wire required for being contained in the connecting cables is great, because two pieces of wire for connection to the outer conductor R and another two pieces of wire for connection to the outer conductor T have to be contained in the whole of the connecting cables. Consequently, there is every probability that an error in wiring is committed and the maintenance work cannot be easily done.

Figure 7:
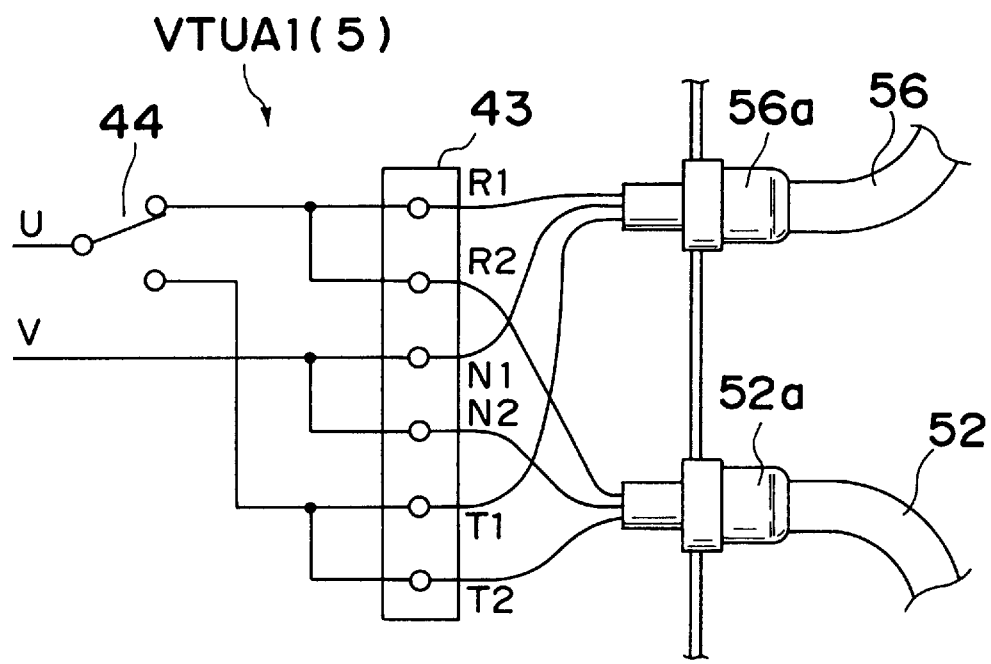
FIG. 7 is a view to help explain another connection of the AC modules.

The following is a resume of another method of connecting the AC modules 5 to the distribution line 3a:

Referring now to FIG. 7, the inverter unit VTUA1 is provided with a terminal block 43 having six junction pole pieces R1, R2, N1, N2, T1 and T2 in sets of three. The junction pole pieces R1, N1 and T1 are connected in parallel to the junction pole pieces R2, N2 and T2 respectively.

A plurality of inverter units VTUA are interconnected by connecting cables 52 connected to the terminal blocks 43. The inverter unit VTUA1, which stands first in the row of the aforesaid plurality of inverter units VTUA, is connected to the distribution line 3a by means of a connecting cable 56 connected to the junction pole pieces R1, N1 and T1 of the terminal block 43.

A change-over switch 44 is interposed between the junction pole pieces R, T and an output terminal U of the inverter circuit. By flipping the change-over switch 44 to one side or the other, the output terminal of the inverter circuit will be selectively connected to the outer conductor R or T.

Instead of a single terminal block 43 used as a support for six junction pole pieces in the embodiment described, it is also possible to use two terminal blocks having three junction pole pieces respectively. Alternatively, an inverter unit may be provided with a single terminal block having three junction pole pieces, to each of which two wires are connected. The single terminal block may further have two junction pole pieces, to which the wires PO and E are connected respectively.

Figure 8:
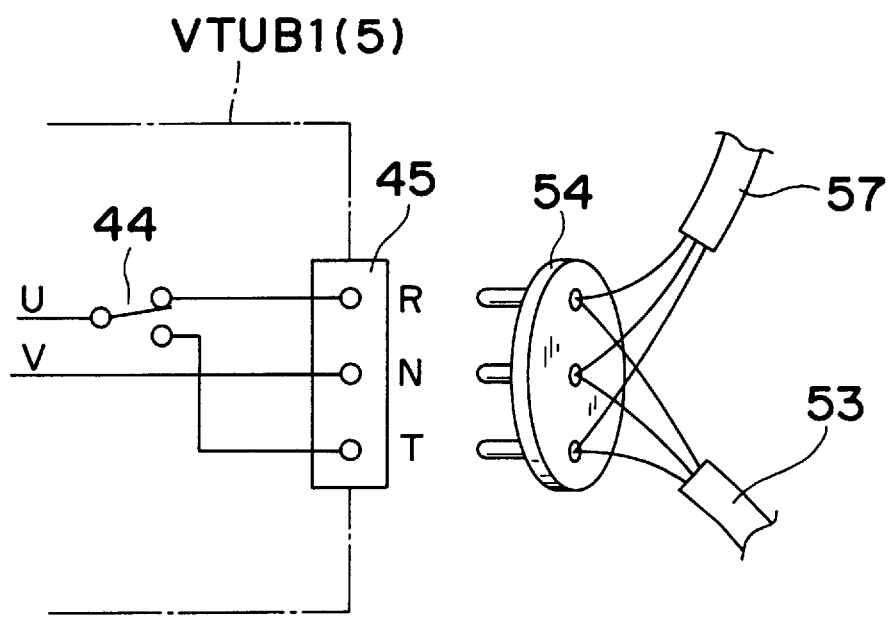
FIG. 8 is a view to help explain still another connection of the AC modules.

Referring now to FIG. 8, a stationary connector 45 having three junction pole pieces R, N and T is mounted on the inverter unit VTUB1. A plurality of inverter units VTUB are interconnected by connecting cables 53, which in turn are interconnected by connectors 54 such that two wires extending respectively from adjacent two connecting cables 53 are connected to one of the junction pole pieces provided on a connector 54. The inverter unit VTUB1, which stands first in the row of the aforesaid plurality of inverter units VTUB, is connected to the distribution line 3a by means of a connecting cable 57 connected to the connector 54.

Instead of the stationary connector 45 used as a support for three junction pole pieces in the embodiment described, it is also possible to use a stationary connector further having two junction pole pieces, to which the wires PO and E are connected respectively.

The independent operation control device 6 independently operates the AC modules 5 when the switches 11 provided in the protective device 4 are opened to cut the connection between the AC modules 5 and the commercial electric power system. Thus the AC modules 5 are adapted for use as an emergency power source. The independent operation control device 6 comprises a reference signal generator 61, battery charger 62, emergency inverter 63, general control unit 64, battery 65, change-over switch 66 and plug receptacle 67.

When the connection between the AC modules 5 and the commercial electric power systemic is cut, the reference signal generator 61 transmits a signal to the distribution line 3a so that the fundamental frequency component S11 of voltage V3 at the junction point between the inverter unit VTU and the commercial electric power system may be fed to the AC modules 5.

The voltage and frequency of the signal transmitted by the reference signal generator 61 are the same as those of electric power which has been supplied through the commercial electric power system. This means that the reference signal generator 61 need not supply the distribution line 3a with electric power but the output from the reference signal generator 61 has only to have the same waveform as the voltage V3. Preferably, however, the reference signal generator 61 should be capable of supplying the distribution line 3a with electric power to the amount of several tens to hundreds of milliwatts, i.e., to the extent of fulfilling the floating condition of the distribution line 3a, etc.

The battery charger 62 rectifies the output from the AC modules 5 and charges the battery 65. The values of the input current, input voltage, output current and output voltage of the battery charger 62 are detected by detectors (not shown) and fed to the general control unit 64. The battery charger 62 has an electromagnetic switch, which is adapted to energize or break the circuit to the distribution line 3a so that the battery charger 62 may be allowed to work only when the connection between the AC modules 5 and the commercial electric power system is cut. In place of the electromagnetic switch, it is also possible to use an electronic controller. The output current of the battery charger 62 is determined by inputs from the AC modules 5, which are controlled by the general control unit 64 in accordance with the state of charge of the battery 65 so that the battery 65 may not be overcharged by the battery charger 62. The output voltage of the AC modules 5 is also controlled by the general control unit 64 so that voltage applied to the battery charger 62 may not exceed the allowable input voltage.

The emergency inverter 63 converts the DC power stored in the battery 65 into 100-volt commercial single-phase AC power. By flipping the change-over switch 66 to one side or the other, the aforesaid AC power will be supplied to the plug receptacle 67. Normally, AC power is supplied to the plug receptable 67 through the distribution line 3b but when the connection between the AC modules 5 and the commercial electric power system is cut, on an occasion of a power failure or when the AC power is not supplied for other reasons, the change-over switch 66 is flipped and the AC power is supplied to the plug receptacle 67 from the emergency inverter 63. The emergency inverter 63 is of a surge-proof type and is capable of instantaneously outputting a surge current which is about ten times as high as a rated current. Consequently, inductive loads requiring a high starting current, such as a motor, can be operated. A refrigerator, washing machine, air conditioner or the like can be connected to the plug receptacle 67.

The general control unit 64 controls the whole of the independent operation control device 6 so as to allow the AC modules 5 to work independently of the commercial electric power system when the connection therebetween is cut by the opening of the switches 11. The general control unit 64 develops a command signal SC, from which a current control signal S14 originates. The aim of the current control signal S14 is to control the output current of each AC module 5 so that a current to be used for charging the battery 65 may assume a suitable value. The command signal SC is transmitted to each AC module 5 through the interface RS485 at intervals of, e.g., a second. Each AC module 5 develops the current control signal S14 on the basis of the command signal SC.

Thus the intervals at which the command signal SC for controlling the output current of each AC module 5 is developed have only to be of the order of a second. This means that the output current of each AC module 5 can be controlled at such fair intervals as to permit serial communication to be carried out.

In brief, by the provision of the independent operation control device 6, electric power generated by the AC modules 5 can be utilized as an emergency power source when the system interconnection is cut because of an accidental power failure or the like happening in the commercial electric power system. The reason for the provision of the battery 65 is that the electric power generated by the sunlight and directly supplied to the loads is not enough to stabilize the supply of electric power to the loads. In order to make good use of the sunlight, electric power generated by the solar cell modules PVM is stored in the battery 65, taken therefrom, converted into commercial electric power, and then supplied to the loads. Household electric appliances such as a home computer, which have been connected to the distribution line 3 or 3a, are switched over to the distribution line 3b at the moment when the system interconnection is cut. Thus the power-supply system 1 in accordance with the invention can be allowed to work as an uninterruptive power supply for the computer. All of these complicated control actions are carried out by the independent operation control device 6, which obviates the necessity for the provision of a complicated electrical circuit in each of the AC modules 5.

The independent operation control device 6 will be found advantageous if it allows a choice between automatic starting and manual starting when the system interconnection is cut. Although not shown in the drawing, it will be understood, therefore, that the general control unit 64 preferably has a change-over switch for making a switchover of the procedure for starting the control to be effected by the independent operation control device 6 from automatic starting to manual starting and vice versa. Other parts which are omitted from the drawing for the sake of simplicity include a starting switch to be used when manual starting is selected.

The manner in which the independent operation control device 6 works will now be described with reference to FIG. 9.

Figure 9:
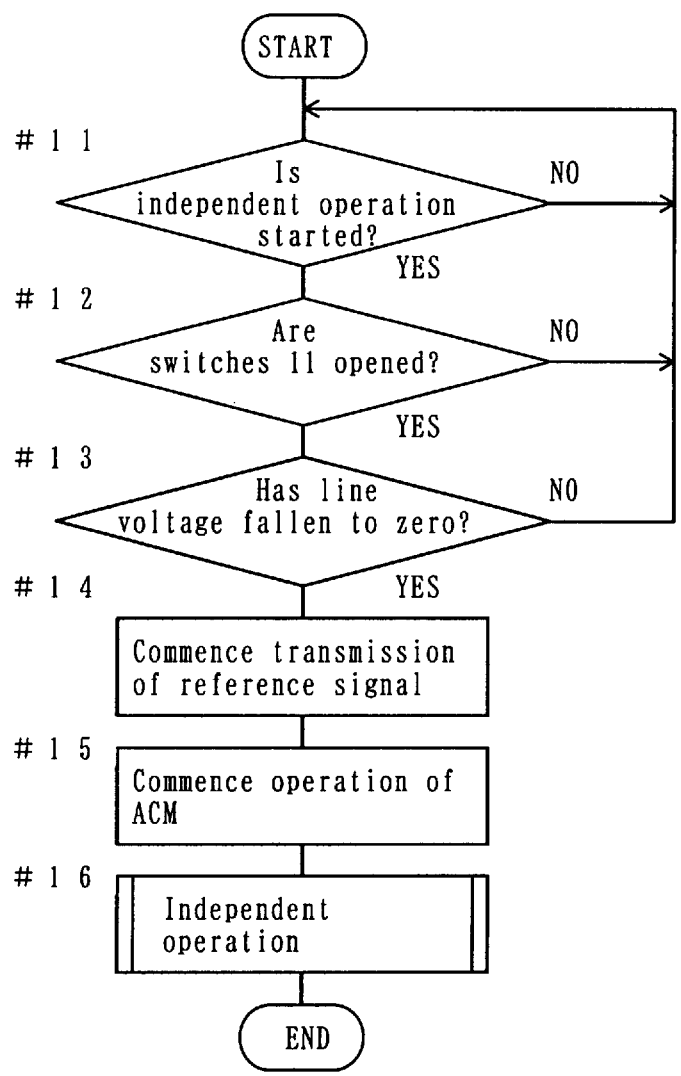
FIG. 9 is a flow diagram representing the manner in which the independent operation control device works.

Referring now to FIG. 9, the reference signal generator 61 is actuated and a reference signal is transmitted to the distribution line 3a (step 14) when independent operation is started, when the switches 11 are opened, and when line voltage has fallen to zero (i.e., when affirmative answers are given to all the questions put in steps 11 to 13). The operation of the AC modules 5 is commenced (step 15), and control over the independent operation is effected (step 16).

The starting of independent operation can be detected by the fact that the aforesaid change-over switch has been thrown into "automatic starting" position or that, when manual starting is selected, the starting switch is closed. The opening of the switches 11 can be detected by the signal SK received from the switches 11. The fact that line voltage has fallen to zero can be detected by the fact that voltage V3 at the junction point between the inverter unit VTU and the commercial electric power system has fallen to zero.

Figure 10:
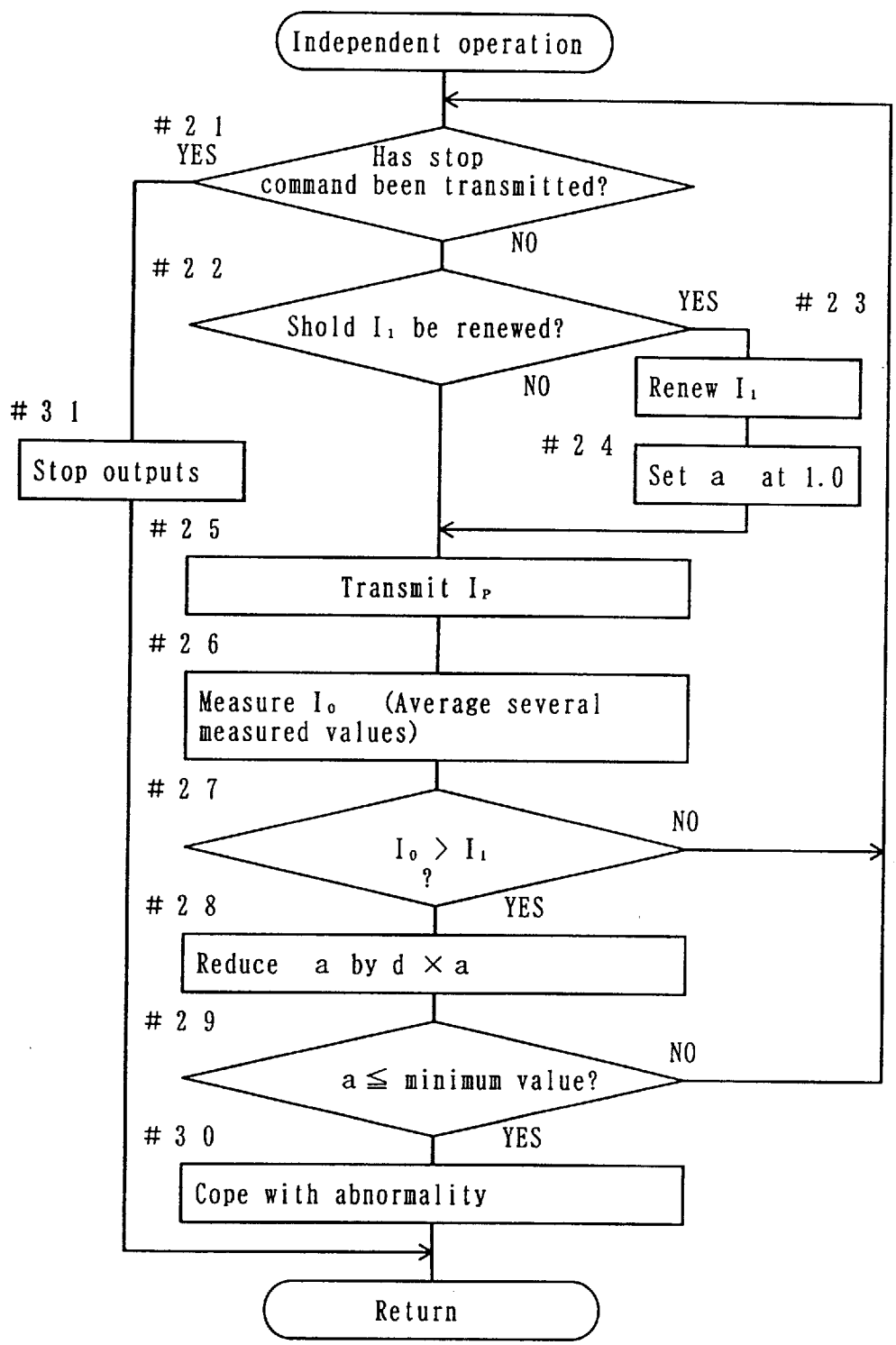
FIG. 10 is a flow diagram representing successive steps in a typical practice of the independent operation.

Referring now to FIG. 10, control over the independent operation begins with passing a judgment on whether or not a stop command has been transmitted (step 21). When the starting switch is opened or when a stop switch is actuated (i.e., when an affirmative answer is given to the question put in step 21), the process of stopping the outputs from the battery charger 62, AC modules 5 and emergency inverter 63 and the process of stopping the working of the reference signal generator 61 are carried out (step 31).

A judgment on whether or not an output current command $I_1$ to the AC modules 5 should be renewed is passed (step 22). Whether or not the output current command $I_1$ should be renewed depends on the state of charge or discharge of the battery 65, to which, e.g., the terminal voltage of the battery 65 gives a clue. The terminal voltage of the battery 65 is monitored with a suitable period (e.g. at intervals of several minutes).

The value of the output current command $I_1$ is renewed (step 23) when the independent operation control device 6 has determined that the command $I_1$ should be renewed (i.e., when an affirmative answer is given to the question put in step 22). A correction factor a is set at 1.0 (step 24). A current command $I_p$ (=a×$I_1$) is transmitted to a current command port (step 25). The signal SC is developed on the basis of the current command $I_p$ and transmitted to the AC modules 5, in which the current control signal S14 is developed on the basis of the signal SC. The output current $I_0$ of the AC modules 5 is measured (step 26) and compared with the output current command $I_1$ (step 27). The procedures of steps 21 to 27 are repeated if the output current $I_0$ is less than the output current command $I_1$ (i.e., if a negative answer is given to the question put in step 27). If the output current $I_0$ is greater than the output current command $I_1$ (i.e., if an affirmative answer is given to the question put in step 27), the correction factor a is reduced by multiplying it by a factor awhich is less than 1 (step 28). The factor a may assume a fixed value. Alternatively, values of the factor a corresponding to the various terminal voltages of the battery 65 may be tabulated beforehand. The procedure of step 28 is repeated on condition that the correction factor a is kept away from a minimum value (step 29).

If the correction factor a becomes less than the minimum value (i.e., if an affirmative answer is given to the question put in step 29), the adjustment of the output current $I_0$ is judged to be impossible and procedures for coping with abnormality are carried out (step 30) such that the outputs from the battery charger 62, AC modules 5 and emergency inverter 63 are stopped, the working of the reference signal generator 61 is also stopped, and an alarm lamp is lighted.

Thus the output current of the AC modules 5 is adjusted in accordance with the terminal voltage of the battery 65 so that the charging current may taper off as the charge of the battery 65 progresses.

Even when some of the solar cell modules. PVM develop trouble, the operation of the AC modules 5 involved can be suspended and balance between the outer conductors R and T can be maintained by the manipulation of the jumper circuit 42, thereby the remaining solar cell modules PVM can be kept working. Each of the solar cell modules PVM independently works. Consequently, even when they are in a different state of power generation from each other, maximum output and high conversion efficiency can be obtained therefrom.

When the connection between the AC modules 5 and the commercial electric power system is cut, the AC modules 5 are adapted for independent operation so that electric power generated by the solar cell modules PVM may be effectively utilized. The battery 65 is charged by the output from the AC modules 5. Commercial electric power is supplied by the emergency inverter 63, which is driven by the battery 65. Thus the supply of electric power is stabilized. The AC modules 5 and the independent operation control device 6 can be utilized as an emergency power source for the household electric appliances.

Instead of the interface RS485 used for bidirectionally giving and receiving the signal SC among the protective device 4, AC modules 5 and independent operation control device 6, it is also possible to use an interface other than RS485, for example RS422 or RS232C, or give and receive an analog signal.

Instead of the jumper circuit 42, it is also possible to use a change-over switch. In ordinary case where the AC modules 5 are in connection with the commercial electric power system, the battery 65 may be subjected to trickle charge. The independent operation control device 6 may allow a choice between automatic starting and manual starting when the system interconnection is cut. For the case where manual starting is selected, the fact that the system interconnection is cut may be made known by means of a signal lamp or an alarm device.

Changes in the output voltage of the solar cell modules PVM, number of the AC modules 5, construction of the inverter unit VTU, protective device 4 and independent operation control device 6, method of communication thereamong, construction and sequence of operation of the power-supply system 1 may be made and substituted for those herein shown and described without departing from the nature and principle of the invention.

The invention being thus described, it will be obvious that the same may be varied in many ways. Such variations are not to be regarded as departure from the spirit and scope of the invention, and all such modifications as would as would be obvious to one skilled in the art are intended to be included within the scope of the following claims.

What is claimed is:

1. A power supply system connectable to a commercial electric power system having a standard AC frequency and voltage, the power-supply system comprising:

at least one AC module each of which includes a solar cell module producing DC current and an inverter unit which outputs a single-phase alternating current having a frequency and voltage that substantially matches the standard AC frequency and voltage;

said at least one AC module is connected to a single-phase three-wire distribution line including a neutral conductor and two outer conductors R and T; and an independent operation control device for independently operating said least one AC module independent of the commercial electric power system while maintaining the output at a frequency and voltage that substantially matches the standard AC frequency and voltage when a connection between said at least one AC module and the commercial electric power system is cut.

2. The power-supply system as defined in claim 1, wherein one of said AC modules is connected to said outer conductor R and another of said AC modules is connected to said outer conductor T.

3. The power-supply system as defined in claim 1, wherein a plurality of said AC modules are connected to said outer conductor R and a plurality of said AC modules are connected to said outer conductor T.

4. The power-supply system as defined in claim 3,
said AC modules having the same output specification; and
wherein the number of said AC modules connected to said outer conductor R is the same as the number of AC modules connected to said outer conductor T.

5. The power-supply system as defined in claim 3,
each of said AC modules having at least three junction pole pieces for connecting said inverter unit to said outer conductor R or T; and
adjacent ones of said AC modules are interconnected by connecting cables connected to said junction pole pieces.

6. The power-supply system as defined in claim 5, wherein each of said AC modules has two sets of said at least three junction pole pieces such that one of said two sets is connected in parallel to the other.

7. The power-supply system as defined in claim 5 or 6 wherein each of said AC modules has one or two stationary connectors, on each of which a set of said at least three junction pole pieces are provided.

8. The power-supply system as defined in claims 5 or 6 wherein each of said AC modules has a terminal block, on which said at least three junction pole pieces are provided.

9. The power-supply system as defined in claims 5 or 6, wherein each of said AC modules includes change-over means for making a switchover of connection between said inverter unit and said at least three junction pole pieces so as to allow said inverter unit to be selectively connected to either of said outer conductors R or T.

10. The power-supply system as defined in claim 3,
each of said AC modules has two stationary connectors, on each of which at least three junction pole pieces are provided for allowing said inverter unit to be connected to either of said outer conductors R or T.
said junction pole pieces provided on one stationary connector are connected in parallel to the corresponding junction pole pieces on the other stationary connector;
wherein adjacent ones of said AC modules are connected to each other by a connecting cable, connectors being provided one at each end of said connecting cable, each of said connectors being provided with junction pole pieces to be connected to the corresponding junction pole pieces provided on said stationary connectors; and
wherein a connector provided at one end of a connecting cable is connected to an AC module which stands first in a row of said AC modules connected to each other, the other end of said connecting cable being connected to said distribution line.

11. The power-supply system as defined in claim 1, said independent operation control device including:
a reference signal generator which transmits a reference signal to said AC modules when the connection between said AC modules and the commercial electric power system is cut,
said reference signal having the same voltage and frequency as the standard voltage and frequency flowing through the commercial electric power system thereby providing a reference against which said AC modules compare to output power independently of the commercial electric power system and with substantially the same standard voltage and frequency; and
a general control unit which transmits a command signal to said AC modules for controlling output voltage or output current furnished by said AC modules.

12. The power-supply system as defined in claim 1, said independent operation control device including:
a reference signal generator transmitting a reference signal to said AC modules when the connection between said AC modules and the commercial electric power system is cut, said reference signal having the same voltage and frequency as the standard voltage and frequency flowing through the commercial electric power system;
a secondary battery;
a battery charger connected to said distribution line so as to charge said secondary battery at least when the connection between said AC modules and the commercial electric power system is cut; and
a general control unit which transmits a command signal to said AC modules for controlling output current furnished by said AC modules when the connection between said AC modules and the commercial electric power system is cut.

13. The power-supply system as defined in claim 12, wherein said general control unit detects an input current and input voltage applied to said battery charger, said command signal being transmitted to control the output current of said AC modules so as to bring the input voltage applied to said battery charger within a specified tolerance.

14. The power-supply system as defined in claim 12, wherein said general control unit detects a charging current supplied to said secondary battery and develops another command signal for bringing said charging current within a proper tolerance.

15. The power-supply system as defined in any of claims 12 to 14, wherein said independent operation control device further includes a second inverter, for which said secondary battery serves as a power source.

16. The power-supply system connectable to a commercial electric power system, comprising:
a plurality of AC modules, each of which includes a solar cell module producing a DC current and an inverter unit adapted to output a single-phase alternating current and connected to a single-phase three-wire distribution line including a neutral conductor and two outer conductors R and T,
wherein a plurality of said AC modules are connected in parallel to the outer conductor R and, wherein a plurality of said AC modules are connected in parallel to said outer conductor T.

17. The power-supply system as defined in claim 16,
each of said AC modules having at least three junction pole pieces for connecting said inverter unit to one of said outer conductors R or T; and
adjacent ones of said AC modules are interconnected by connecting cables connected to said junction pole pieces.

18. The power-supply system as defined in claim 17, wherein each of said AC modules includes change-over means for making a switchover of connection between said inverter unit and said at least three junction pole pieces so as to allow said inverter unit to be selectively connected to either of said outer conductors R or T.

19. An AC module for use in a power-supply system connectable to a commercial power supply system, said AC module comprising:

a solar cell modules;

an inverter unit connected to a single-phase three-wire distribution line including a neutral conductor and two outer conductors R and T;

two stationary connectors, on each of which at least three junction pole pieces are provided for allowing said inverter unit to be connected to one of said outer conductors R or T;

said junction pole pieces provided on one stationary connector are connected in parallel to the corresponding junction pole pieces provided on the other stationary connector; and change-over means for making a switchover of connection between said inverter unit and said at least three junction pole pieces so as to allow said inverter unit to be selectively connected to either of said outer conductors R or T.

20. An independent operation control device for a power-supply system, said independent operation control device is utilized in said power-supply system connecting an inverter unit and a commercial electric power system, when the connection between said inverter unit and said commercial electric power system is cut, so that said inverter unit which converts DC power produced by a solar power generation unit into a commercial alternating current can be operated independently of the commercial electric power system, comprising:

a reference signal generator which transmits a reference signal to said inverter unit when the connection between said inverter unit and said commercial electric power system is cut, said reference signal having the same voltage and frequency as a current which has flowed through the commercial electric power system thereby providing a reference against which said inverter compares to output power independently of the commercial electric power system and with substantially the same voltage and frequency; and a general control unit which transmits a command signal to said inverter unit for controlling output voltage or output current furnished by said inverter unit.

21. The independent operation control device for a power-supply system as defined in claim 20, further comprising:

a secondary battery; and a battery charger connected to a distribution line so as to charge said secondary battery at least when the connection between said inverted unit and said commercial electric power system is cut.

22. The independent operation control device for a power-supply system as defined in claim 21, wherein said general control unit detects an input current and input voltage applied to said battery charger, said command signal being transmitted to control the output current of said inverter unit so as to bring the input voltage applied to said battery charging within a specified tolerance.

23. The independent operation control device for a power-supply system as defined in claim 21, wherein said general control unit detects a charging current supplied to said secondary battery and develops a command signal for bringing said charging current within a proper tolerance.

24. The independent operation control device for a power-supply system as defined in any of claims 21 to 23, wherein said independent operation control device further comprises a second inverter, for which said secondary battery serves as a power source.

* * * * *